United States Patent [19]
Savage

[11] 3,907,053
[45] Sept. 23, 1975

[54] VEHICLE SUBASSEMBLY
[75] Inventor: Donald D. Savage, Marietta, Ga.
[73] Assignee: B. J. Powell, Atlanta, Ga. ; a part interest
[22] Filed: Feb. 5, 1974
[21] Appl. No.: 439,736

[52] U.S. Cl.............. 180/6.48; 180/44 F; 180/55; 180/66 F
[51] Int. Cl.² ........................................ B62D 11/04
[58] Field of Search ............ 180/6.48, 6.5, 6.2, 6.7, 180/1 F, 44 F, 55, 66 F, 54 F; 280/106 R

[56] References Cited
UNITED STATES PATENTS

| | | | |
|---|---|---|---|
| 1,026,662 | 5/1912 | Eisner | 180/66 F |
| 1,292,972 | 1/1919 | Thompson | 180/6.2 |
| 2,095,344 | 10/1937 | Nelson | 180/54 F |
| 2,748,878 | 6/1956 | Tourneau | 180/6.2 |
| 2,944,830 | 7/1960 | Osborne | 280/106 R |
| 3,526,288 | 9/1970 | Cryder et al. | 180/6.48 |

Primary Examiner—David Schonberg
Attorney, Agent, or Firm—B. J. Powell

[57] ABSTRACT

A vehicle base subassembly with a base frame comprising a pair of spaced apart side rails joined by spaced apart torque tubes with the torque tubes centered about the drive axes of the subassembly. A prime mover module is slidably mounted in the base frame with an internal combustion engine driving a pair of hydraulic pumps. A hydraulic drive motor is carried by opposite ends of each of the torque tubes with the motors on one side of the subassembly operated in tandem and independently from the motors on the other side. A wheel and tire assembly is carried by each drive motor and the output of the hydraulic pumps is controlled by a single control stick to operate the subassembly according to the skid-steer principle. A mounting platform for accessory equipment is provided on the base subassembly to accept different pieces of accessory equipment.

22 Claims, 13 Drawing Figures

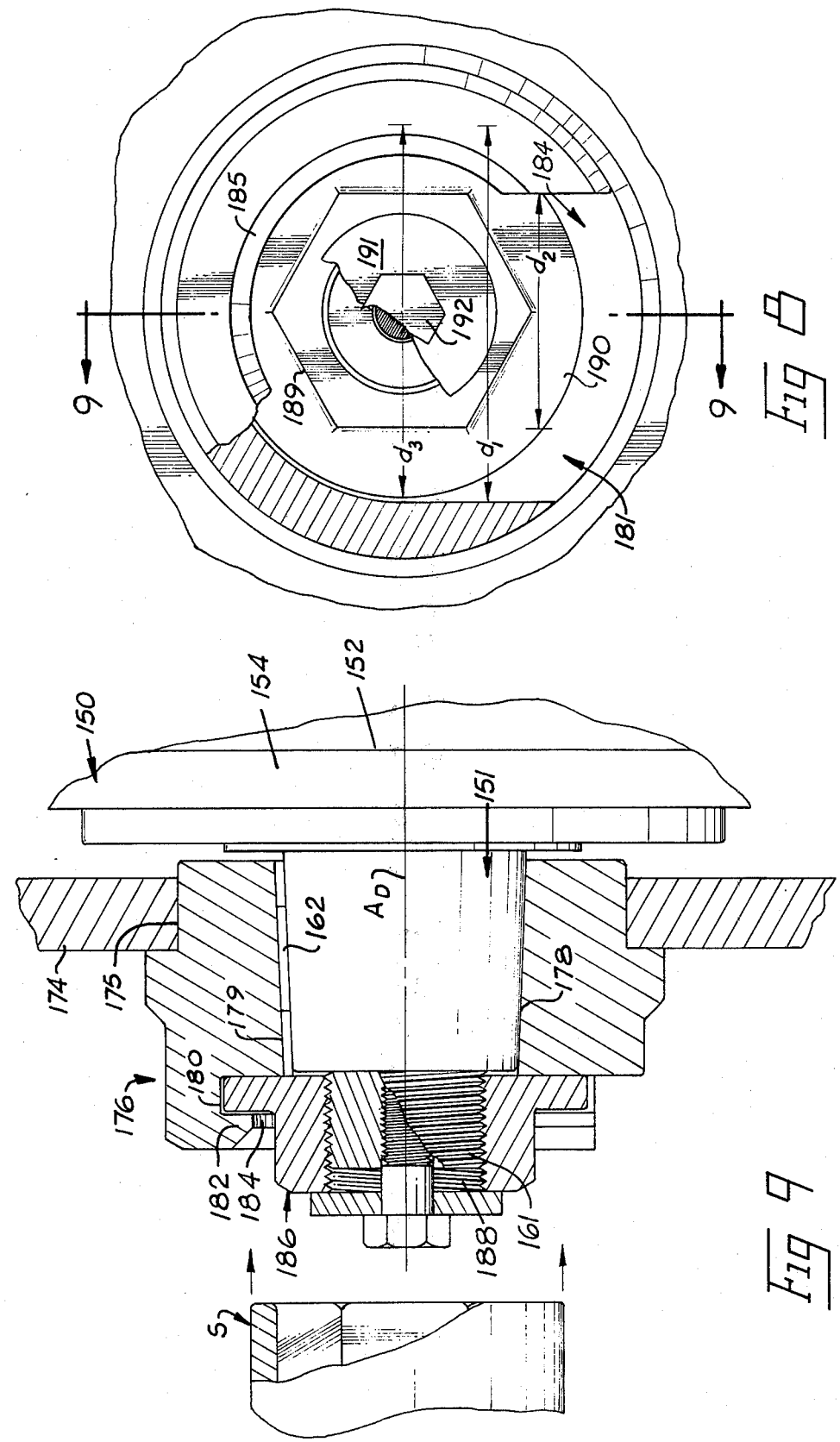

VEHICLE SUBASSEMBLY

BACKGROUND OF THE INVENTION

Vehicles which use a base subassembly having independently driven wheels on opposite sides thereof are available on the market today. This general type of steering system is commonly known as the "skid steer" principle. Because such vehicles use an independent axle at each wheel on the opposite sides of the vehicle, large amounts of torque are generated within the frame of the base subassembly. The prior art base subassemblies have generally used a torque tube displaced from the rotational axis of the wheels in an attempt to compensate for the torque applied as the vehicle is operated. This has created problems in that a majority of the torque was applied directly to the frame of the base subassembly without being transmitted to the torque tube. Another problem with these prior art base subassemblies is that the lack of accessibility to the components, especially the prime mover, in the base subassembly for maintenance and repair. This has required considerable down time while the subassembly was disassembled to reach the damaged component to repair same. Most of the prior art base subassemblies were designed for a single use so that if an attempt was made to mount different types of accessory equipment thereon as is frequently required in the economical operation of such equipment, this accessory equipment could not easily be mounted on the base subassembly without considerable remanufacture of the subassembly and/or, even if such equipment could be mounted, it could not be used without damage to the base subassembly. Another problem with such prior art base subassemblies is that they require two control levers to operate the base subassembly which require the use of both of the operator's hands to control the base subassembly thereby requiring the use of the operator's feet to control accessory equipment. This has created a problem of hand-eye-foot cordination in order to successfully operate such equipment using a prior art base subassembly.

SUMMARY OF THE INVENTION

These and other problems and disadvantages associated with the prior art are overcome by the invention disclosed herein in that a vehicle subassembly is provided which is capable of compensating for the torque applied to the subassembly even though separate drive shafts are used at each wheel, which has all of the components of the subassembly easily accessible for maintenance and repair, onto which various accessory equipment can be mounted easily and which requires only one of the operator's hands to control the operation of the subassembly thereby freeing the other hand for use in controlling the accessory equipment. The controls for the subassembly may be located at any position on the subassembly and are movable so that the operator's position can be easily relocated to effectively operate any accessory equipment. The hydraulic system provides limited slip driving capability to the wheels so that the assembly still has driving power even though some of the wheels may temporarily lose traction.

The apparatus of the invention comprises generally a base frame including a pair of spaced apart side rails joined by a pair of spaced apart torque tubes oriented along axes which coincide with the rotational axis of each of the wheels. A mounting assembly is connected to opposite ends of each of the torque tubes as well as to the side rail at the end of the torque tube for mounting the drive motor for each of the wheels. A ground engaging wheel and tire assembly is mounted on each of the drive motors so that the wheel and tire assembly rotates about the axis of its associated torque tube. A prime mover module including an internal combustion engine with hydraulic pumps mounted thereon is removably carried in the base frame between the spaced apart side rails and operatively connected to each of the drive motors to drive the subassembly according to the skid steer principle. The entire prime mover module can be slidably removed from between the side rails of the base frame for servicing. A carriage superstructure is provided on the base frame for mounting various accessory equipment thereon and a single lever control mechanism is provided which is flexibly connected to the prime mover module to control the operation thereof so that the control mechanism can be selectively located at any desired point on the vehicle subassembly.

These and other features and advantages of the invention will become more clearly understood upon consideration of the following specification and accompanying drawings wherein like characters of reference designate corresponding parts throughout the several views and in which:

BRIEF DESCRIPTION OF THE DRAWINGS

FIG. 8 is a front view of the hub assembly of the wheel and tire assembly;

FIG. 9 is a cross-sectional view taken along line 9—9 in FIG. 8;

Figure 1:
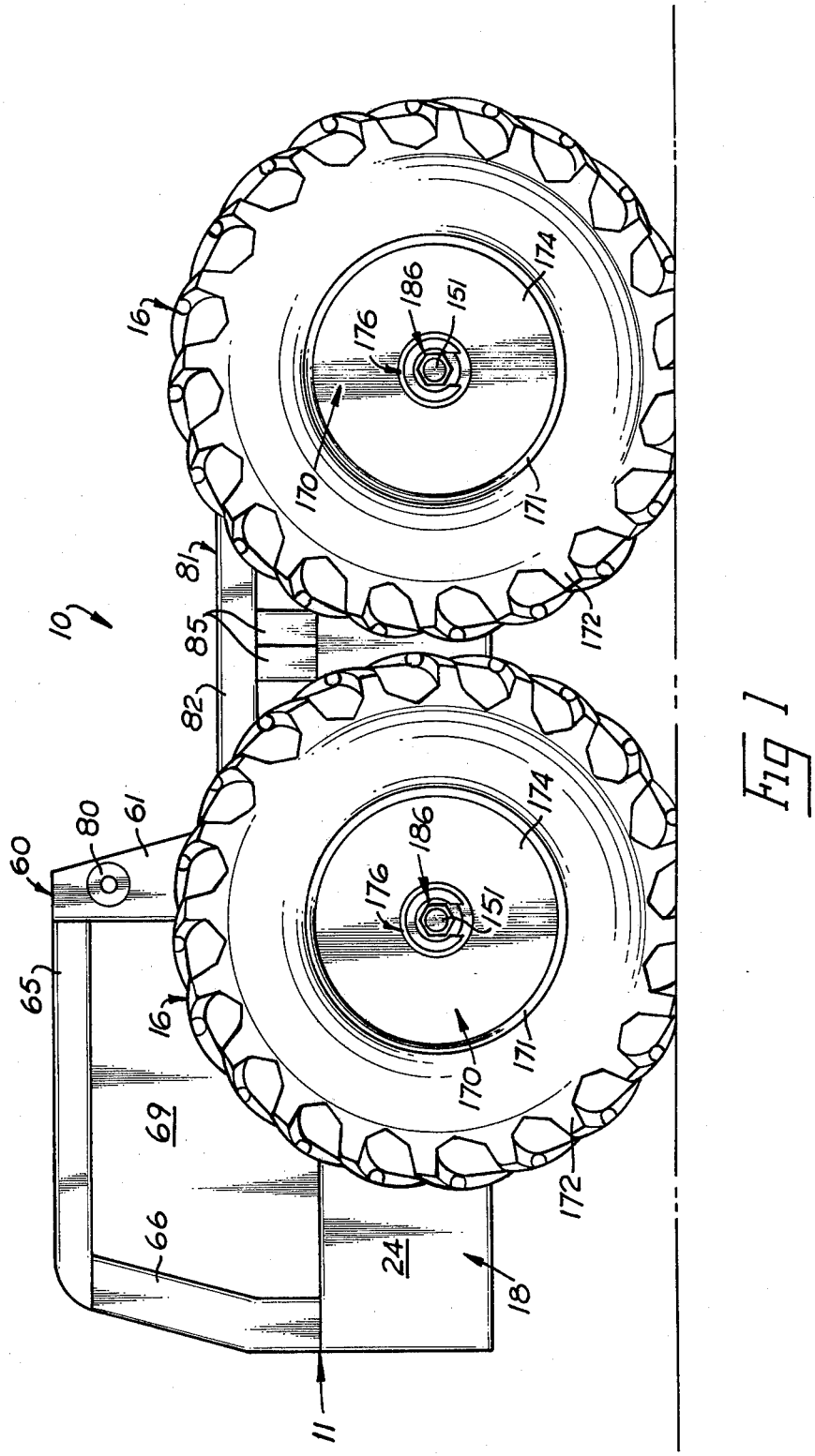
FIG. 1 is a side elevational view of a base subassembly embodying the invention.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to the figures, it will be seen that the invention is a vehicle subassembly 10 which supports the vehicle and provide the operational power to the vehicle. The vehicle subassembly 10 includes generally a base frame 11, a prime mover module 12 removably mounted in the base frame 11, a plurality of drive means 15 carried by the base frame 11 and a wheel and tire assembly 16 carried by each drive means 15. The prime mover module 12 operates the drive means 15 so as to selectively drive the wheel and tire assemblies 16 to propel the vehicle subassembly 10.

BASE FRAME

The base frame 11 as best seen in FIGS. 1-5 includes a pair of spaced apart side rails 18 joined by a pair of spaced apart torque tubes 19. Each of the side rails 18 is tubular with a generally rectangular cross-sectional shape defined by a top wall 20, bottom wall 21, inside wall 22 and outside wall 24. The side rails 18 are positioned by the torque tubes 19 so that their longitudinal centerlines are generally parallel to the longitudinal centerline CL of the vehicle subassembly 10. For sake of simplicity, the left end of subassembly 10 as seen in FIG. 1 will be called the front end, it being understood that either end may be used as the front end in operation.

Figure 2:
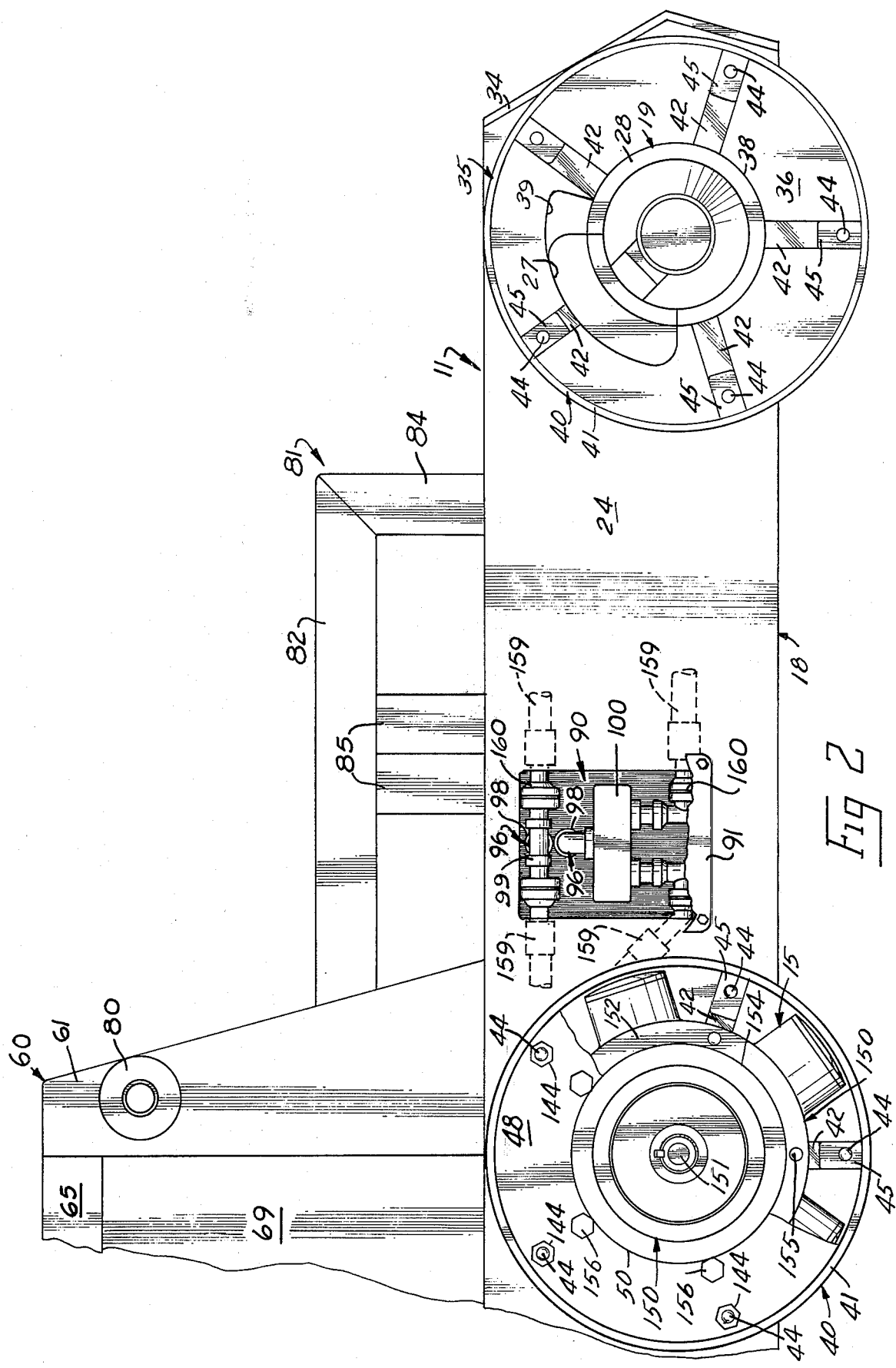
FIG. 2 is a side elevational view similar to FIG. 1 with some of the wheel and tire assemblies as well as the drive motors removed.
Figure 5:
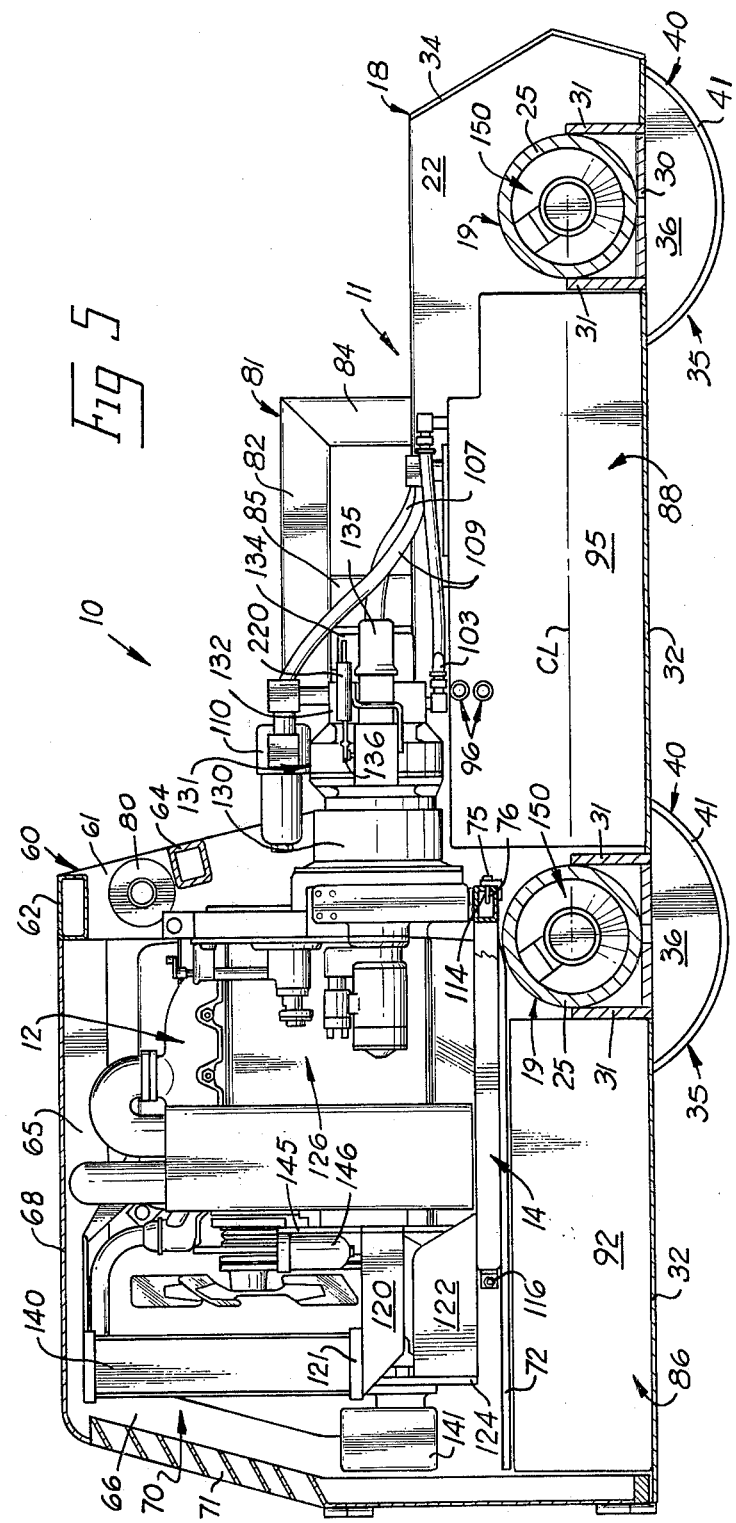
FIG. 5 is a longitudinal cross-sectional view of the subassembly taken along lines 5—5 in FIGS. 3 and 4.

The torque tubes 19 are tubular with an annular side wall 25 and are arranged so that the centerline of each of the tubes 19 coincides with the drive axis $A_D$ of the vehicle subassembly 10 as will become more apparent. It will also be noted that the centerline of each of the torque tubes 19 is arranged substantially normal to the longitudinal centerline CL of the vehicle subassembly 10. Each torque tube 19 extends through aligned openings 26 in both the inside and outside walls 22 and 24 and are affixed to both the inside and outside walls 22 and 24 by conventional means such as welding. The outside ends 28 of the torque tubes 19 project slightly beyond the outside walls 24 of the side rails 18 as will become more apparent. An arcuate access cutout 27 is formed in the outside wall 24 as seen in FIG. 2 of the side rails 18 at its juncture with the outside ends 28 of the torque tubes 19 and also in the ends 28 of the torque tubes 19 as will become more apparent. A reinforcing plate 30 as seen in FIG. 5 extends between the inside walls 22 of the side rails 18 immediately under each of the torque tubes 19 which is welded to the walls 22 of the side rails 18 at opposite ends thereof and plug welded to the side wall 25 of the torque tubes 19. Side braces 31 extend between the inside walls 22 of the side rails 18 on opposite sides of each of the torque tubes 19 and are welded to both the side wall 25 of each torque tube 19, the inside walls 22 of the side rails 18 and to the reinforcing plate 30 along opposite edges thereof. Bottom pans 32 serve to close the bottom of the base frame 11 between the inside walls 22 of the side rails 18 and the reinforcing plate 30. Each of the side rails 18 is closed at opposite ends thereof by end plates 34 which join the walls 20, 21, 22 and 24.

Figure 3:
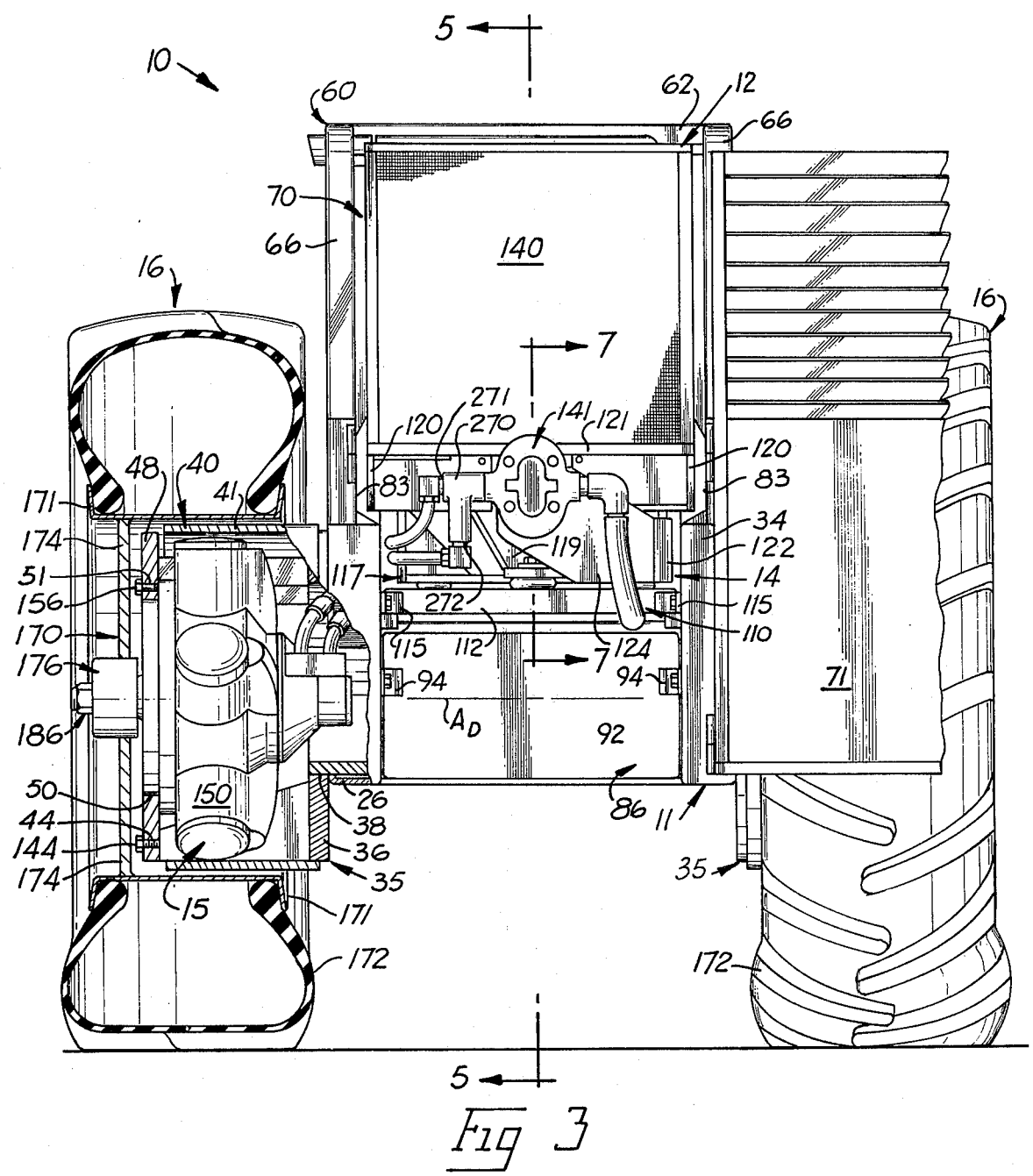
FIG. 3 is an end elevational view from the prime mover end of the subassembly.

A mounting unit 35 as seen in FIGS. 2 and 3 is carried on the projecting ends 28 of each of the torque tubes 19 adjacent the outside wall 24 of the side rails 18. The mounting unit 35 serves to mount the drive means therein as will become more apparent. Each mounting unit 35 includes an annular transfer disc 36 defining an inside opening 38 to receive the projecting end 28 of the torque tube 19 therein and is attached to the projecting end 28 of the torque tube 19 by welding. An access opening 39 is provided in the transfer disc 36 adjacent the inside opening 38 in registration with the access cutout 27 in the side rail 18 as will become more apparent. Each of the transfer disks 36 is also welded to the outside wall 24 of the side rails 18 so as to fixedly attach the disc 36 to both the torque tube 19 and the side rail 18. It will be noted that the transfer disc is tangent to the top wall 20 of the side rail 18 and projects below the bottom wall 21 of the side rail 18. A spacer ring 40 having an annular side wall 41 with an inside diameter substantially equal to the outside diameter of the transfer disc 36 is welded to the outer peripheral edge of the transfer disc 36 and extends outwardly therefrom concentrically about the drive axis $A_D$. A plurality of inwardly projecting support blocks 42 are attached to the inside of side wall 41 and circumferentially spaced thereabout and also attached to the transfer disc 36. An outwardly extending threaded stud 44 is provided on the outer face 45 of each of the blocks 42. The faces 45 of the blocks 42 lie in a plane substantially normal to the drive axis $A_D$ and spaced just outwardly of the outer edge 46 of the spacer ring 40. A disc-shaped motor mount 48 having a diameter substantially equal to the diameter of the transfer disc 36 is positioned on the threaded studs 44 through lug holes 49 through the motor mount 48. The lug holes 49 are arranged so that the motor mount 48 is concentrically located with respect to the drive axis $A_D$ and a drive axle opening 50 is centrally located in the motor mount 48 as will become more apparent. A second inner series of motor mount holes 51 are provided about the opening 50 to mount the drive means 15 on the motor mount 48 as will become more apparent.

A superstructure 60 as seen in FIGS. 1-5 is mounted on the top wall 20 of the side rails 18 and extends upwardly therefrom. The superstructure 60 serves to protect the prime mover module 12 and as a mounting platform for accessory equipment. The superstructure 60 includes a pair of primary upright stanchions 61 extending upwardly from the side rails 18 just forwardly of the vertical plane of the drive axis $A_D$ shown on the left in FIG. 5. An upper cross brace 62 connects the upper ends of the stanchions 61 and an intermediate cross brace 64 connects the upright stanchions 61 a prescribed distance below the upper ends thereof. A pair of upper cowling frame members 65 extend forwardly from the upper ends of the support stanchion 61 over each of the side rails 18 and generally parallel thereto as seen in FIGS. 1 and 5. The front end of each of the frame members 65 is connected to the front end of the side rail 18 through a depending angular brace 66. An upper cover plate 68 extends between the frame members 65 and side cover plates 69 cover each of the openings formed between each stanchion 61, frame member 65, brace 66 and side rail 18. This forms a forwardly opening enclosure 70 in which the prime mover package 12 is received as will be more fully explained. The front end of the enclosure 70 is selectively closed by a louvered door 71 hinged to the side rails 18 and braces 66.

A pair of inwardly projecting slide rails 72 as seen in FIG. 5 are provided on the inside wall 22 of the side rails 18 in enclosure 70 intermediate their height which slidably mounts the prime mover module 12 thereon as will become more apparent. The plane of the upper slide surface 74 of each of the slide rails 72 is generally parallel to the top wall 20 of the side rail 18 and located just above the upper edge of the front torque tube 19.

An angular abutment 75 is provided just rearwardly of the front torque tube 19 and includes a rearwardly extending locating pin 76 which engages the prime mover module 12 to locate same as will become more apparent.

Figure 4:
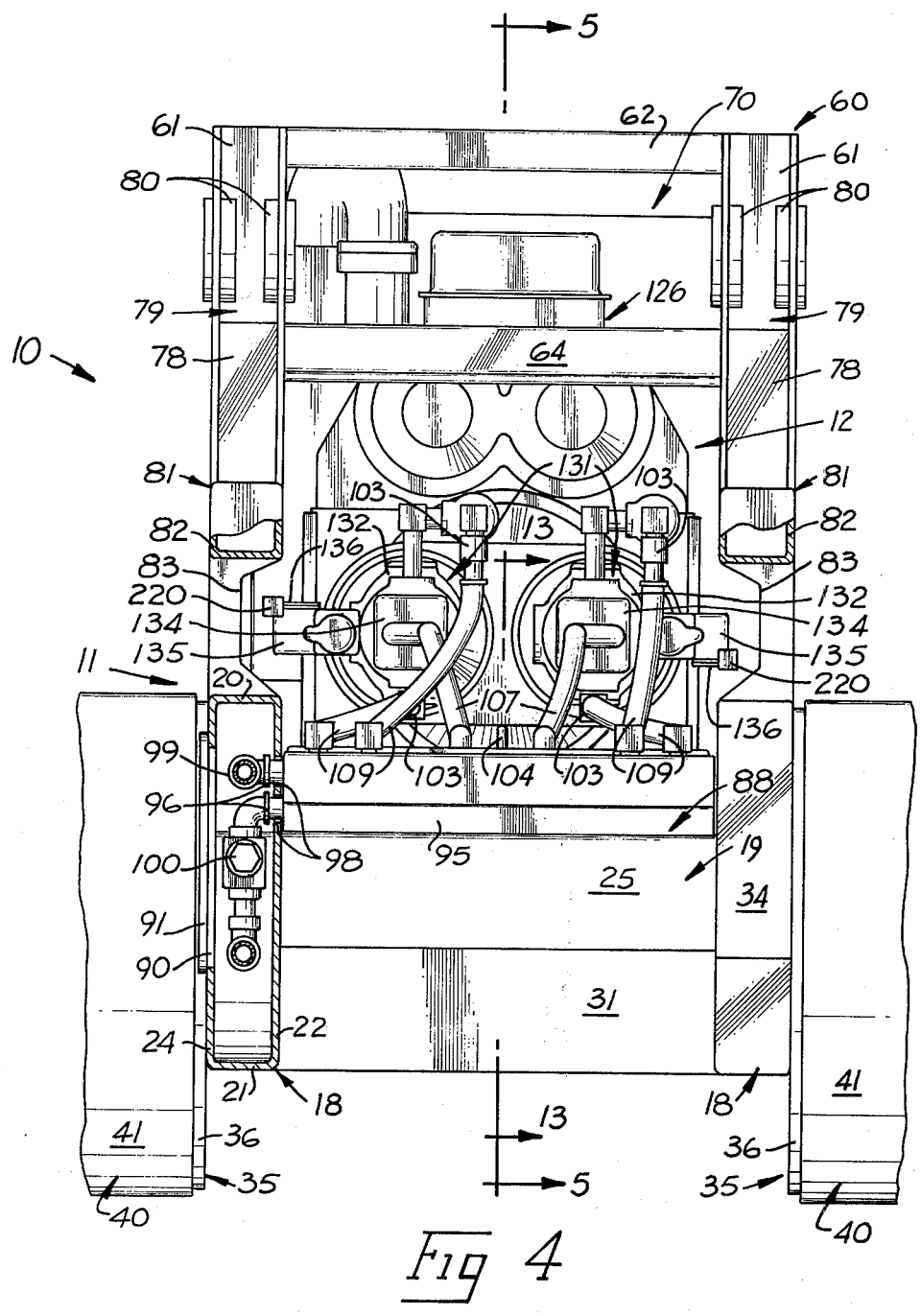
FIG. 4 is an end elevational view of the opposite end of the subassembly.

Each of the primary upright stanchions 61 has a U-shaped cross section with the open rear side thereof closed by a reinforcing plate 78 as seen in FIG. 4 for a prescribed distance from the side rail 18 and then curves rearwardly between the sides of the stanchions 61 to form an arm receiving pivot pocket 79. A pair of aligned journals 80 are provided through the sides of the stanchions 61 with aligned passages therethrough to pivotally mount accessory equipment thereon. The inside lower ends of stanchions 61 are recessed at 83 as best seen in FIG. 4 to provide sufficient clearance for the prime mover module 12 to be removed forwardly from enclosure 70 when the door 71 is opened as best seen in FIG. 3.

A pair of accessory mounting pads 81 extend rearwardly from the stanchions 61. The mounting pads 81 each include an upper support rail 82 supported at its rear end by a standard 84 and intermediate its ends by standards 85. The mounting pads 81 also serve as side protectors for the prime mover module 12 as will become more apparent.

A cutout 90 as seen in FIG. 2 is provided through each of the outside walls 24 of the side rails 18 intermediate the torque tubes 19 and is selectively closed by an access plate 91. The purpose of these cutouts 90 will be more fully disclosed hereinafter.

It will be noted that one of the torque tubes 19 is positioned at one end of side rails 18 while the other torque tube 19 is positioned intermediate the length of the side rails 18 at a point spaced from the rear torque tube a distance of approximately 4/7 of the length of side rails 18. Thus, the bottom engine enclosure 70 lies in a plane tangent to the uppermost point on torque tubes 19. This also defines a first tank space 86 between side rails 18, enclosure 70, bottom pan 32 and the front torque tube 19 at the front end of subassembly 10 and a second tank space 88 between the torque tubes 19, side rails 18 and bottom pan 32 as will become more apparent.

PRIME MOVER MODULE

The prime mover module 12 is designed to be removably received into the enclosure 70 in frame 11 on the slide rails 72. This greatly facilitates the servicing and repair of the module 12 since it contains the components requiring frequent maintenance and more likely to need repair. The module 12 furnishes the power to drive both the subassembly 10 and accessory equipment carried thereby.

The module 12 as seen in FIGS. 3–7 includes an undercarriage 14, an internal combustion engine 126 mounted on the undercarriage 14, a pair of primary hydraulic pump assemblies 131 drivingly connected to engine 126 through a transfer case 130 on the rear end of the engine, and an auxiliary hydraulic pump 141 drivingly connected to the front end of the engine. The entire module 12 is supported through the undercarriage 14. The engine 126 illustrated is a conventional diesel engine and the transfer case 130 is a conventional one input, dual output unit with the case 130 shown available from Hydreco. The primary pump assemblies 131 are conventional variable piston pump assemblies such as the Hydreco Phase IV Standard Variable Pump illustrated. The pump assemblies 131 have an integral main pump 132 with an integral charge pump 134 that supplies fluid to the main pump 132. The main pump 132 has a variable and reversible output controlled by control lever 136 through an integral booster pump 135 as is known in the art. The auxiliary pump 141 is a conventional fixed displacement pump also illustrated as a standard Hydreco pump.

Figure 7:
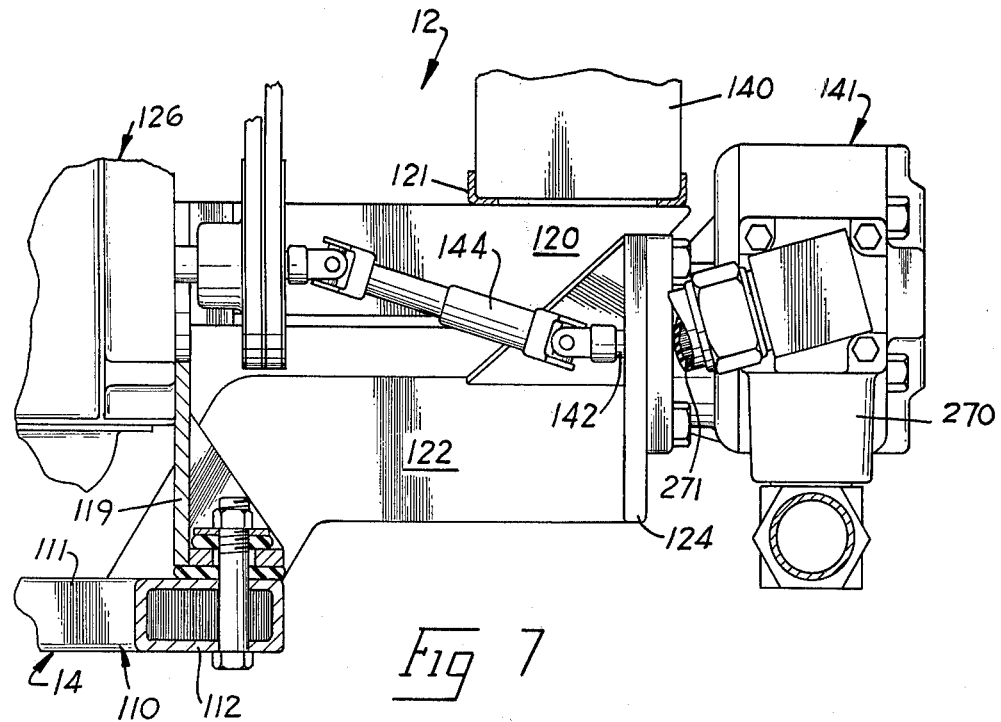
FIG. 7 is a partial enlarged cross-sectional view taken along line 7—7 in FIG. 3.
Figure 6:
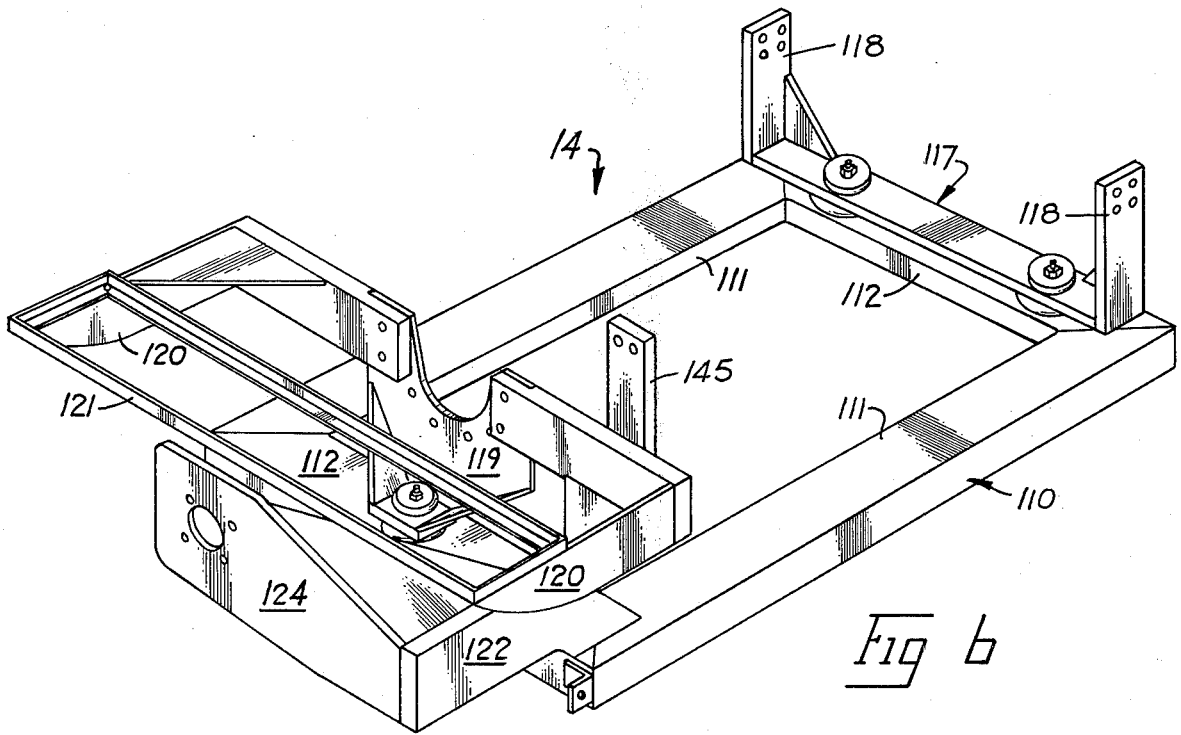
FIG. 6 is a perspective view of the undercarriage for the prime mover module.

The undercarriage 14 includes generally an open rectangular frame 110 comprising a pair of side rails 111 joined by end rails 112. That end rail 112 facing the abutment 75 is provided with a pair of locating apertures 114 as seen in FIG. 5 through which the locating pin 76 is slidably received as the frame 110 is moved toward the abutment 75 and the front end rail 112 is provided with a pair of flanges 115 which may be removably pinned to the inside walls 22 of the side rails 18 through pins 116 to lock the frame 110 in position on the slide rails 72. That end of the rectangular frame 110 facing the abutment 75 is provided with a U-shaped rear engine mount 117 with a pair of upstanding mounting legs 118 which resiliently mount one end of the engine 126 as will become more apparent. The front end of the rectangular frame 110 opposite the abutment 75 is provided with an upstanding central motor mount 119 which mounts the front end of the engine 126 as will become more apparent. A pair of side support brackets 120 extend forwardly from opposite sides of the central motor mount 119 to mount a radiator support 121 thereon spaced forwardly of the central motor mount 119 and behind the door 71. A forwardly extending support plate 122 is mounted on one side of the front end rail 112 and extends forwardly and upwardly therefrom to join with an auxiliary pump bracket 124 extending inwardly across the front end of the enclosure 70 behind door 71 to mount the auxiliary pump 141 thereon. Since the engine 126 carries the transfer case 130 and the case 130 carries the pump assemblies 131, it will be seen that the entire module 12 is supported on undercarriage 14. A conventional radiator 140 is mounted in the radiator support 121 so that the radiator 140 is resiliently mounted with engine 126. An upstanding bracket 145 on bracket 120 as seen in FIG. 5 mounts the engine oil filter 146. The auxiliary pump bracket 124 laterally centers the pump 141 with respect to the engine 126 and the input shaft 142 of the auxiliary pump 141 is drivingly connected to the front end of the drive shaft of engine 126 through a universally connected drive shaft 144 as seen in FIG. 7.

A fuel tank 92 as seen in FIGS. 3 and 5 with a generally rectangular cross-section is slidably received on the bottom pan 32 at the front end of the subassembly 10. The fuel tank 92 has a height less than the distance from the top of the bottom pan 32 to the slide rails 72. A pair of holding tabs 94 hold the tank 92 in position. A hydraulic fluid tank 95 as seen in FIGS. 4, 5 and 13 is carried on the bottom pan 32 between the torque tubes 19 in space 88. The tank 95 has a generally rectangular cross section so that the side walls of the tank 95 lie in juxtaposition with the inside walls 22 of the side rails 18. The female portions of a pair of quick-disconnect couplings 96 are provided in each of the walls of the hydraulic fluid tank 95 as seen in FIG. 5 in juxtaposition with the inside walls 22 of the side rails 18 at each of the cutouts 90. An access port 98 as seen in FIG. 2 is provided through the inside wall 22 of the side rail 18 in alignment with each female portion of the quick-disconnect couplings 96 so that the male portions of couplings 96 can pass through the ports 98 and engage the female portions of the couplings 96. A T-fitting 99 is connected to the upper coupling 96 and housed in the cutout 90 while conventional 50/50 divider/combiner valve 100 is connected to the lower coupling 96 and housed within the cutout 90. In this manner, it will be seen that the hydraulic tank 95 can be removed from between the side rails 18 by releasing the quick-disconnect couplings 96 and then lifting the tank 95 from between the side rails 18.

An opening 101 as seen in FIG. 13 is provided in the top of the tank 95 which is releasably covered by a mounting cover plate 102. A quick release mechanism 104 is provided in the cover plate 102 which engages the tank 95. A pair of intake filters 105 are mounted from the bottom of the cover plate 102 and extend into the tank 95. The intake filters 105 are connected to the intake port of the charge pumps 134 of the primary pump assemblies 131 by hoses 107. Thus, the filters 105 can be easily changed by operating the mechanism 104 to release cover plate 102 and lifting it from tank 95. This also lifts the filters from tank 95 since they are attached to plate 102.

The female portions of the couplings 96 are connected individually to transfer ports 106 in the top of tank 95 by transfer pipe 108 within tank 95 as seen in FIG. 13. Hoses 109 with quick-disconnect couplings 103 connect ports 106 with the ports on the main pumps 132 of pump assemblies 131. Filters 110 are connected to the pumps 132 and are arranged horizontally so that the filters 110 will pass under brace 64 in order that the module 12 can be removed without removal of filters 110.

It will also be noted that the booster pumps 135 project outwardly from the pump assemblies 131 but the recesses 83 in stanchions 61 as seen in FIG. 4 allow the pumps 135 to pass thereby. Thus, the module can be removed from the frame 11 simply by disconnecting hoses 107 and 109.

DRIVE MEANS

Each drive means 15 is a hydraulic drive motor 150, one drive means 15 being mounted in each of the mounting units 35 as seen in FIGS. 2 and 3. The drive motors 150 are conventional fixed displacement piston motors and provided with a single output drive shaft 151 centrally extending through a mounting flange 152. The drive motors 150 also have a circular support shoulder 154 adjacent the mounting flange 152 with the drive axle opening 50 in the motor mount 48 being sized to just receive the support shoulder 154 therethrough with the mounting flange 152 lying behind the motor mount 48 about the opening 50. Threaded holes 155 are provided through the mounting flange 152 which are selectively registrable with the motor mount holes 51 in the motor mount 48 so that support bolts 156 received through the motor mount holes 51 threadedly engage the holes 155 to attach the motor 150 to the inside of the motor mount 48. The hydraulic ports 158 as seen in FIG. 3 to the motor 50 are located within the access openings 27 and 39 and connected to one of the pump assemblies 131 through flexible hoses 159 with quick-disconnect fittings 160 as will become more apparent. Thus, it will be seen that each hydraulic motor 150 is mounted on the motor mount 48 with the drive shaft 151 projecting through the opening 50 therein so that the drive shaft 151 rotates about the drive axis $A_D$ extending through the torque tubes 19. The drive shaft 151 is provided with a threaded end 161 to mount the wheel and tire assembly 16 as will become more apparent. Also, it will be noted that shaft 151 is provided with a tapered support section 164 to support the wheel and tire assembly 16 thereon and a key 162 is provided at section 164 to drivingly connect the wheel and tire assembly 16 to the shaft 151 as seen in FIG. 9.

One of the hoses 159 to each of the motors 150 on each side rail 18 passes inside the rail 18 and is connected to the T-fitting 99 through its quick-disconnect fitting 160 and the other of the hoses 159 to each of the motors 150 on each side rail 18 passes inside the rail 18 and is connected to the combiner/divider valve 100 through its quick-disconnect fitting 160. This allows the motors 150 to be easily disconnected at the fittings 160 to facilitate removal of the motors.

The motors 150 are attached to the motor mounts 48 and then the motor mount 48 attached to the blocks 42 by lug nuts 144 engaging the studs 44 as seen in FIG. 3. This also facilitates removal of motors 150 since they can be supported through the motor mounts 48.

WHEEL AND TIRE ASSEMBLY

A wheel and tire assembly 16 as seen in FIGS. 3, 8 and 9 is mounted on the projecting end of each of the output drive shafts 151 of the drive motors 150. Each wheel and tire assembly 16 includes a hub assembly 170 onto which is mounted a conventional rim 171 which in turn mounts an off-the-road rubber tire 172. The hub assembly 170 is attached to the inside outer edge of the rim 171 and includes a circular support plate 174 which is attached to the rim and extends inwardly therefrom. A central opening 175 is provided through the plate 174 and into which is mounted a hub 176 which is welded to the plate 174 about the opening 175. The hub 176 defines a central passage 178 therethrough which is tapered to be received on the tapered support portion 164 of the drive shaft 151 to support the wheel and tire assembly 16 so that the support plate 174 is generally normal to the drive axis $A_D$ extending through the drive shaft 151. This supports the wheel and tire assembly 16 so that the rim 171 and tire 172 extend back over and around the spacer ring 40. A key slot 179 is defined in the hub 176 at the central passage 178 to receive the key 162 on shaft 151 therein to drivingly connect the shaft 151 with the hub 176.

The hub 176 further defines a generally semicircular recess 180 therein arranged in a plane generally normal to the drive axis $A_D$ at approximately the juncture of the tapered support portion 164 and threaded end 161 of the drive shaft 151. The recess 180 has open mouth 181 of width $d_1$ extending outwardly through the hub 176 and a generally semicircular flange 182 is provided outboard of the recess 180 with an opening 184 therein of a width $d_2$ less than width $d_1$ that is generally aligned with the open mouth 181 to the recess 180. The outside inner edge 185 of flange 182 is inwardly tapered as will become more apparent.

A hub nut 186 is provided which threadedly engages the threaded end 161 of the drive shaft 151 to force the hub 176 onto the tapered support portion 164 to mount the wheel and tire assembly 16 on the shaft 151. The hub nut 186 is internally threaded at 188 to threadedly engage the threaded end 161 and is provided with conventional hexagonal wrenching surfaces 189 to receive a conventional socket S partly shown in FIG. 9 to tighten and loosen the nut 186. The innermost end of the nut 186 is provided with a circular flange 190 having an outer diameter $d_3$ just slidably receivable into the semicircular recess 180 through the open mouth 181. The minimum outside diameter between opposed wrenching surfaces 189 of the nut 186 is substantially equal or slightly less than the width $d_2$ of the opening 184 in the semicircular flange 182 so that the circular flange 190 can be slipped into the semicircular recess 180 behind the flange 182 since the nut 186 can be oriented so that wrenching surfaces 189 pass through the opening 184. Thus, it will be seen that as the hub nut 186 is tightened onto the threaded end 161 of the drive shaft 151, the circular flange 190 will force the hub 176 onto the tapered support portion 164 to position the wheel and tire assembly 16 onto the output shaft 151 of the drive motor 150. It will also be noted, however, that as the nut 186 is loosened, the circular flange 190 on the nut will engage the semicircular flange 182 on the hub 176 and forcibly withdraw the hub 176 and thus the wheel and tire assembly 16 from the tapered support portion 164 of the drive shaft 151. Thus, field removal and replacement of a wheel and tire assembly 16 is greatly facilitated since the hub nut 186 and hub construction 176 have a built-in hub puller. A circular locking plate 191 and locking bolt 192 are provided to lock the nut 186 onto shaft 151. The threaded end 161 of the output shaft 151 is internally threaded at 194 so that the locking bolt can be tightened in the threads 194 to cause the locking plate 191 to engage the outside edge of the hub nut 186 to lock it in position. This prevents the wheel and tire assembly 16 from inadvertently coming off of the drive shaft 151 of drive motor 150.

HYDRAULIC CONTROL SYSTEM

Figure 10:
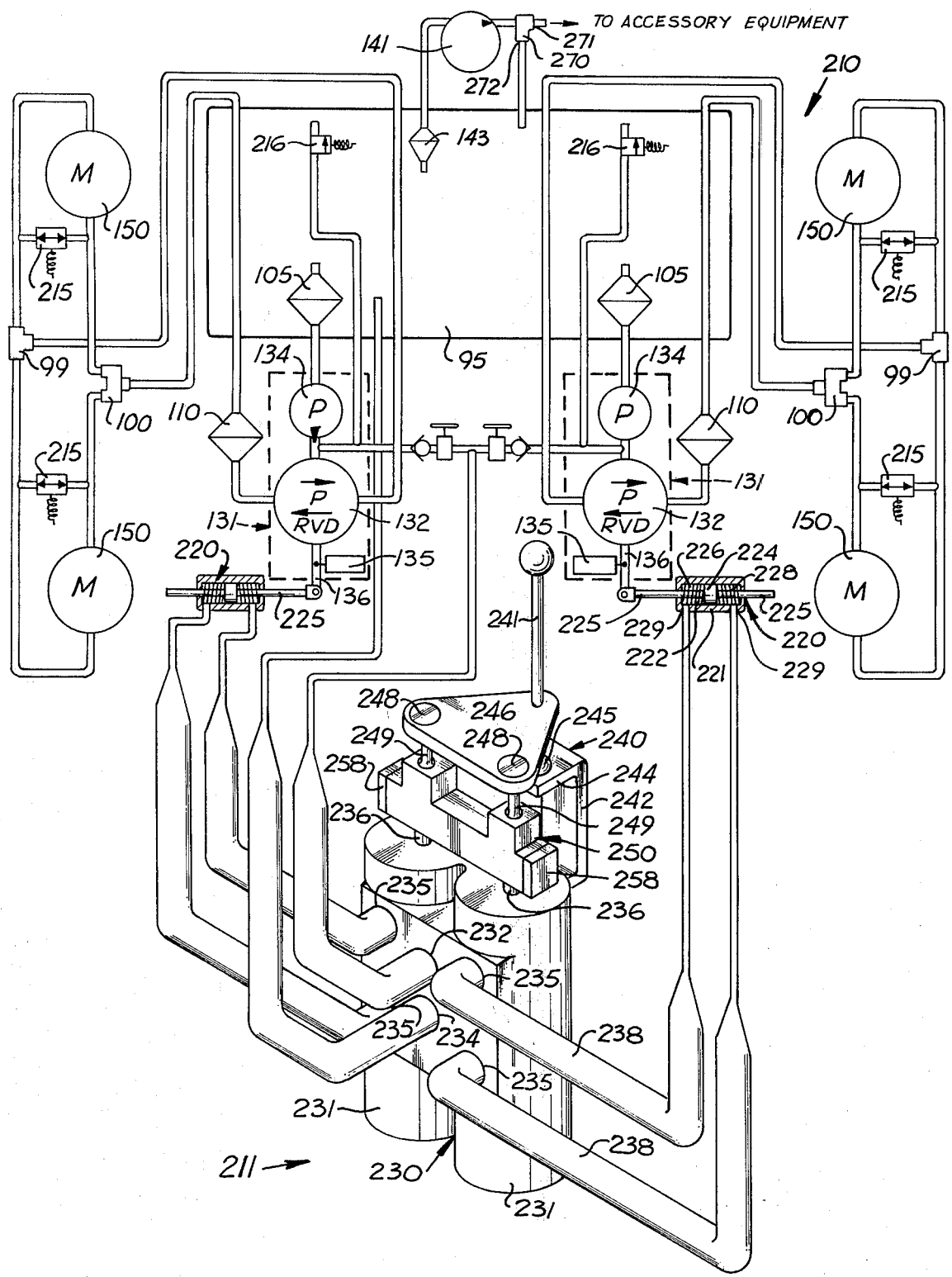
FIG. 10 is a hydraulic schematic diagram of the control circuit of the invention.

The hydraulic control system 210 for the subassembly 10 is shown schematically in FIG. 10. A single lever control mechanism 211 controls operation of both pump assemblies 131 to steer the subassembly 10. As already noted, subassembly 10 uses the skid steer control principle that operates the wheel and tire assemblies 15 on one side of the subassembly independently of those on the other side to steer same.

One port of each main pump 132 is connected to one port of each of the motors 150 on one side of the subassembly 10 while the other port of each main pump 132 is connected to the other port of the motors 150 through the combiner/divider valve 100 associated with that side of the subassembly. A cross port relief valve 215 is connected in parallel across the ports of each motor 150. This forms a closed loop between each main pump 132 and the pair of motors 150 associated therewith. The charge pump 134 has its intake connected to tank 95 and its relief port connected back to tank 95 through relief valve 216. The motors 150 on each side are connected so that they rotate in the same direction so that their rotation is responsive to the output of main pump 132 associated therewith. The combiner/divider valve 100 associated with each pair of motors 150 provides limited slip capability to same and the relief valves 215 allow one of the motors 150 to stall without disabling one side of the machine.

The control lever 136 to each pump assembly 131 is positioned by a remotely controlled positioner 220 mounted on assembly 131 adjacent lever 136. The positioner 220 includes a housing 221 with a chamber 222 therein in which a piston 224 is slidably mounted. A piston rod 225 connected to piston 224 projects from housing 221 and is pinned to lever 136. A spring 226 is positioned between the piston 224 and one end of housing 221 while a spring 228 is positioned between piston 224 and the opposite end of housing 221. Springs 226 and 228 are of equal strength to normally urge piston 224 toward a central position in chamber 222 as seen in FIG. 10. Ports 229 to chamber 222 are provided in opposite ends of housing 221 so that a pressure differential between ports 229 will cause the piston 224 and thus piston rod 225 to shift until the springs 226 and 228 offset this pressure differential. Thus, the position of the control lever 136 can be selectively controlled by controlling the pressure differential between ports 229.

Figure 11:
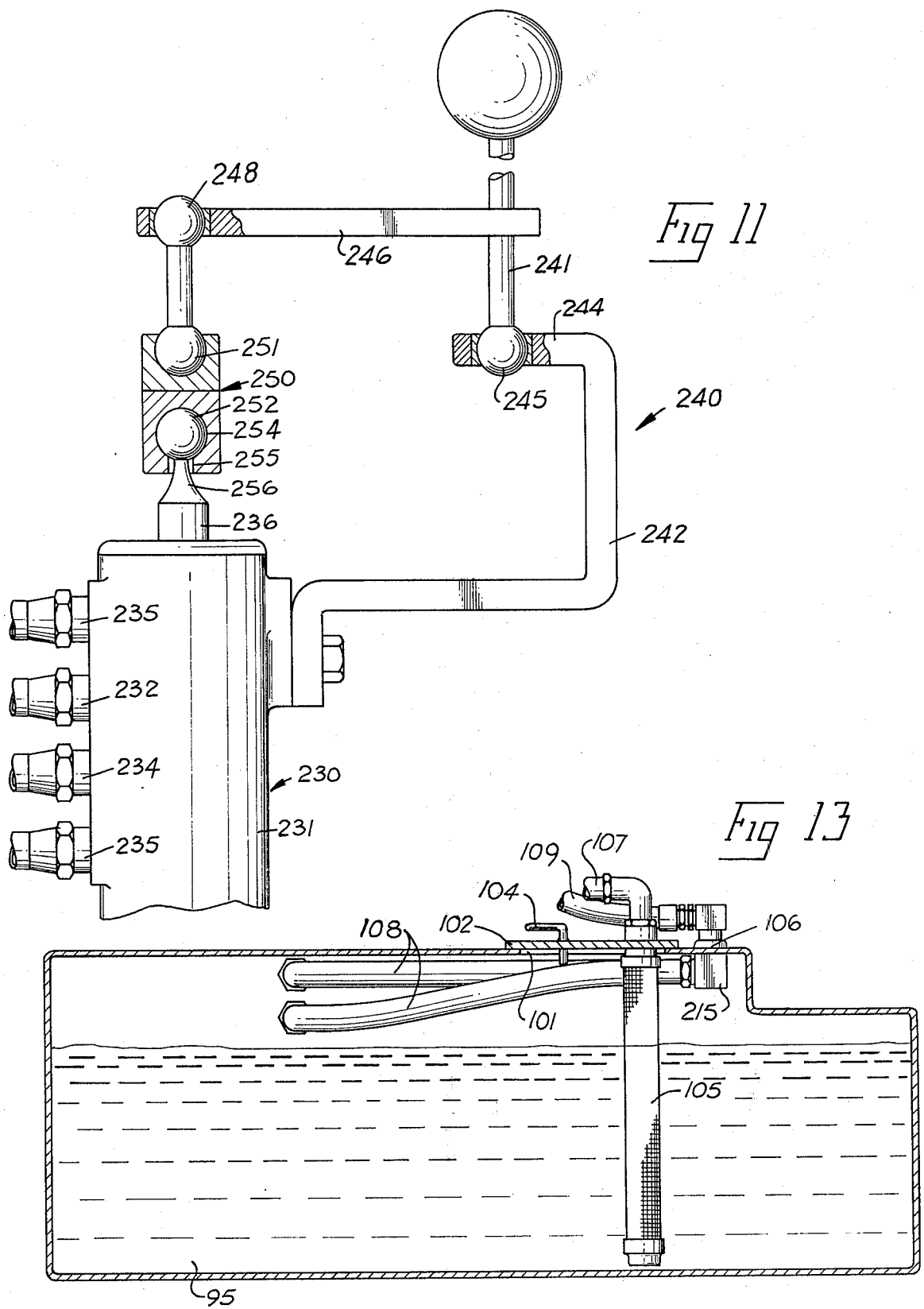
FIG. 11 is a partial elevational view of a steering control mechanism for the invention.
Figure 12:
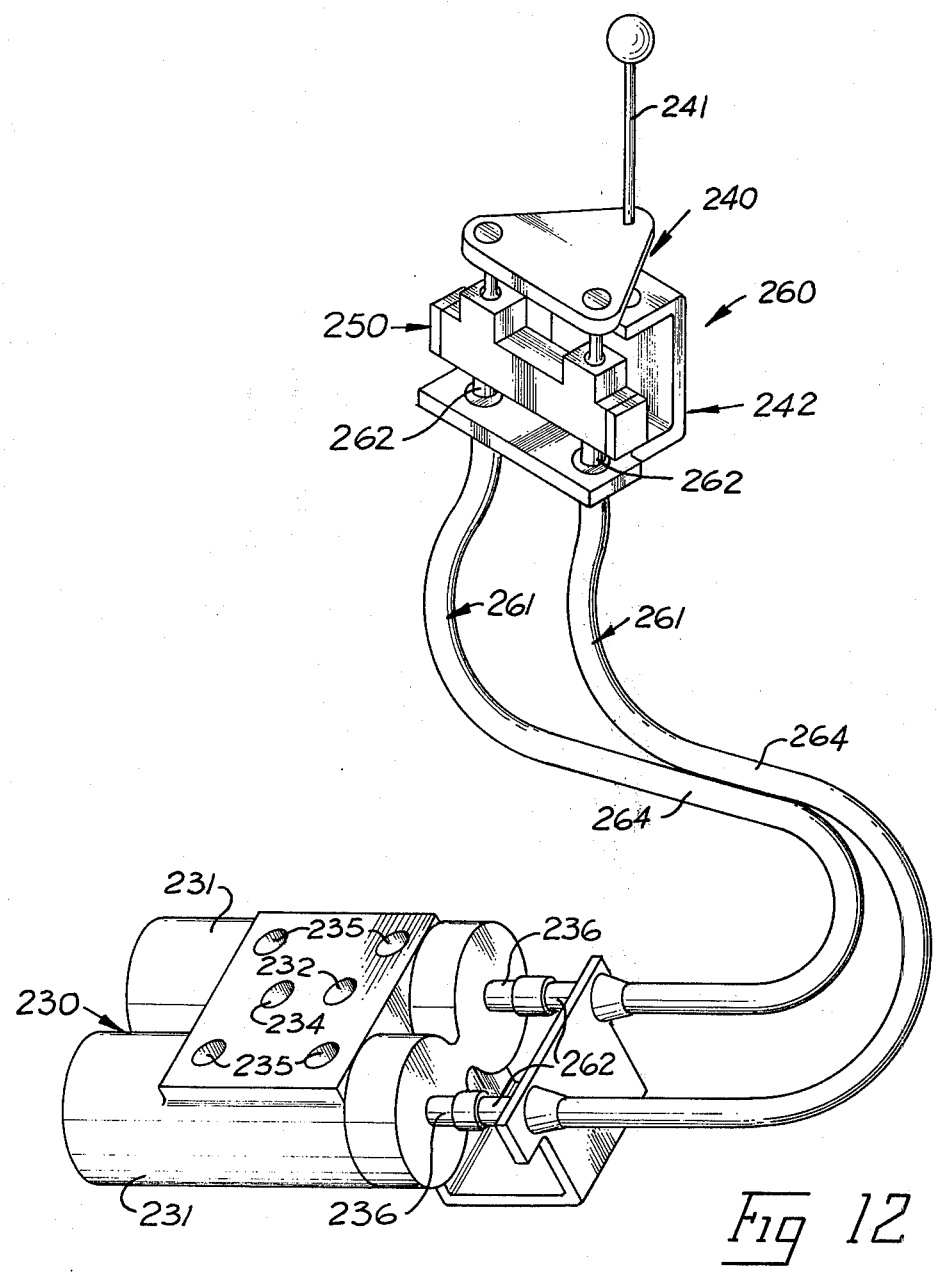
FIG. 12 is a perspective drawing of an alternate steering control mechanism for the invention; and, FIG. 13 is a cross-sectional view of the hydraulic fluid tank taken along line 13—13 in FIG. 4.

The single lever control mechanism 211 as seen in FIGS. 11 and 12 includes a conventional differential valve unit 230 having a pair of lever operated four way differential control valves 231 in a side-by-side relationship. The valves 231 have a common inlet 232 connected to the pressure side of the charge pumps 134 and a common exhaust 234 connected to tank 95. Each valve 231 has a pair of differential control outlet ports 235 between which a pressure differential is generated in response to movement of a plunger 236 in the valve 231. Hoses 238 connect the ports 235 with the ports 229 in one of the positioners 220. Thus, it will be seen that the output to motors 150 on one side of the subassembly 10 from pump assembly 131 is controlled by one of the valves 231 through its plunger 236 while the output to motors 150 on the opposite side of subassembly 10 from the other pump assembly 131 is controlled by the other valve 231 through its plunger 236.

A single stick control unit 240 connects both plungers 236 so that the entire steering and speed control of subassembly 10 is manually controlled through a single control stick 241 on unit 240. The unit 240 is best seen in FIGS. 11 and 12 and includes a U-shaped mounting bracket 242 mounted on valve unit 230. The upper leg 244 of bracket 242 has a ball and socket connection 245 therein to which the control stick 241 is attached so that it can be swiveled. A generally triangular control plate 246 is fixed to the control stick 241 at one of its corners so that as the stick 241 is moved, the plate 246 will also be moved. The other corners of plate 246 generally overlie the plungers 236 of valves 231 and each is provided with a ball and socket connection 248. A pair of transfer rods 249 are connected to the connections 248 at one of their ends and to a transfer block 250 at their other ends through ball and socket connections 251 in block 250. The block 250 serves to connect the ball ends 252 on the ends of plungers 236 with the transfer rods 249. The ball and socket connections 251 are on one side of block 250 while a cylindrical passage 254 is provided through the block and connected to the opposite side by a slot 255. The ball ends 252 on plungers 236 are received in passage 254 with the reduced diameter neck 256 extending through slot 255. End caps 258 close opposite ends of passage 254 and slots 255 to retain the ball ends 252 of plungers 236 within passage 254. Thus, it will be seen that movement of stick 241 operates both plungers 236 to control the output of pump assemblies 131 so that both the steering and speed control of subassembly 10 is provided from the single stick according to the skid steer principle.

An alternate embodiment of the single lever control mechanism is illustrated in FIG. 12 and is designated generally by the numeral 260. The mechanism 260 is a modification of mechanism 211 to provide for the remote operation of the differential valve unit and those components of mechanism 260 common with mechanism 211 have the same reference numbers applied thereto. The basic difference between the mechanisms 211 and 260 is that the transfer block 250 of the single stick control unit 240 is drivingly connected to the ball ends of the cables 262 of a pair of push-pull flexible control cable assemblies 261. The ends of the flexible tubes 264 slidably carrying cables 262 at unit 240 are held by the mounting bracket 242 which is not mounted on valve unit 230. The opposite ends of tubes 264 are held in a bracket 265 mounted on valve unit 230 and the opposite ends of cables 262 are operatively connected to the ball ends 252 of plungers 236. Thus, it will be seen that the control cable assemblies 261 transfer the movement of control stick 241 to plungers 236 so that the operation is the same as set forth for mechanism 211. The major advantage of mechanism 260 over mechanism 211 is that the valve unit 230 with its six hydraulic lines can be located closely adjacent pump assemblies 231 and fixed in place. This then allows the control unit 240 to be easily relocated about the subassembly 10 necessitating moving only the two control cable assemblies connecting the control unit 240 with the valve unit 230.

The intake side of auxiliary pump 141 is connected to tank 95 through filter 143 and its output side is provided with a dump valve 270. Accessory equipment (not shown) is connected to the pressure outlet 271 of dump valve 270 and the dump outlet 272 of valve 270 is connected back to tank 95. Valve 270 is conventional and solenoid operated to selectively power the accessory equipment.

From the foregoing, it will be seen that the subassembly 10 is modular so that the prime mover module 12 can be easily removed from enclosure 70 and the fuel tank 92 can be easily removed from space 86. The hydraulic tank 95 can also be removed through enclosure 70 from space 88 after removal of module 12 and the T-fittings 99 as well as valves 100.

While specific embodiments of the invention have been disclosed herein, it it to be understood that full use may be made of modifications, substitutions and equivalents without departing from the scope of the inventive concept.

I claim:
1. A vehicle subassembly comprising:
a base frame including:
a pair of spaced apart side rails generally parallel to each other,
a pair of spaced apart torque tubes connecting said side rails and oriented generally perpendicular to said side rails and along spaced apart, generally parallel central axes, and
mounting means connected to opposite ends of each of said torque tubes, said mounting means further connected to said side rails;
drive means carried by each of said mounting means including a projecting drive shaft extending outwardly therefrom generally coaxially with said central axis of said associated torque tube; and,
a ground engaging wheel and tire assembly mounted on each of said drive shafts for supporting and propelling said subassembly.

2. The vehicle subassembly of claim 1 further including a prime mover module slidably and removably mounted between said side rails at one end thereof, said prime mover module operatively connected to each of said drive means for causing each of said drive means to selectively drivingly rotate its associated drive shaft to propel said subassembly.

3. The vehicle subassembly of claim 2 wherein said prime mover module comprises:
an undercarriage;
an internal combustion engine having a crankshaft, a front mount connection and a pair of rear mount connections; and,
a pair of variable output, reversible hydraulic primary pumps carried by said engine and drivingly connected to one end of said crankshaft,
said undercarriage including an open rectangular frame slidably received between said side rails, a front engine mount resiliently mounted on one end of said frame and supportingly connected to said front mount connection of said engine, and a U-shaped rear engine mount resiliently mounted on the opposite end of said frame and supportingly connected to said rear mount connections of said engine; and,
wherein said base frame of said subassembly further comprises:
a pair of slide rails carried on the inside of said side rails in opposition to each other and lying in a horizontal plane to slidably support said rectangular frame of said undercarriage thereon; and,
locating pin means for locating said frame of said undercarriage thereon.

4. The vehicle subassembly of claim 3 wherein said prime mover module further comprises a radiator and wherein said undercarriage further includes a radiator support carrying said radiator and a pair of side support brackets connecting said radiator support with opposite sides of said front engine mount to resiliently mount said radiator.

5. The vehicle subassembly of claim 4 wherein said prime mover module further includes an auxiliary hydraulic pump and a universally mounted drive shaft drivingly connecting said auxiliary pump to that end of said engine crankshaft opposite said primary pumps; and wherein said undercarriage further includes a pump bracket connecting said auxiliary pump with the front end of said rectangular frame.

6. The vehicle subassembly of claim 2 wherein said prime mover module includes:
an internal combustion engine having a crankshaft; and
a pair of variable output, reversible hydraulic primary pumps drivingly connected to said crankshaft, each of said pumps having a control lever, the output of said pump varying in response to the position of said control lever;
said subassembly further including control means for independently positioning said control levers of said pumps, said control means comprising:
a pair of actuators, each of said actuators operatively connected to one of said control levers, each of said actuators including a housing defining a fluid chamber therein; a piston slidably carried in said chamber; a piston rod carried by said piston, movable with said piston, slidably projecting from said housing and pinned to said control lever at its projecting end; a first spring positioned between said piston and said housing in one end of said chamber; and a second spring positioned between said piston and said housing in the opposite end of said chamber, said first and second springs constantly urging said piston toward a central position in said chamber, and said housing defining a first port communicating with one end of said chamber and a second port communicating with the opposite end of said chamber; and, a control mechanism operatively connected to said first and second ports of each of said actuators for selectively generating a fluid pressure differential between said first and second ports of each of said actuators independently of the other of said actuators to selectively shift the position of said piston and thus the position of said control lever attached thereto.

7. The vehicle subassembly of claim 6 wherein said control mechanism includes:

a pair of four way differential control valves, each of said valves having a pair of differential control outlet ports between which a pressure differential is selectively generated in response to movement of a plunger projecting from said valve, said outlet ports of one of said valves operatively connected to said first and second ports of one of said actuators and said outlet ports of the other of said valves operatively connected to said first and second ports of the other of said actuators so that one of said plungers controls the output of one of said primary pumps and the other of said plungers control the output of the other of said primary pumps; and, a control unit operatively connected to said plungers for operating same, said control unit including:
a support bracket;
a control stick;
a first ball joint mounting said control stick on said support bracket;
a control member carried by said control stick spaced from said first ball joint and movable with said control stick;
a pair of spaced apart transfer rods;
a pair of second ball joints mounting the ends of said transfer rods on said control member at spaced apart points spaced from said control stick;
a drive member;
a pair of third ball joints mounting the other ends of said transfer rods on said drive member at spaced apart points; and,
connector means operatively connecting said drive member with said plungers of said control valves to move said plungers in response to movement of said control stick.

8. The vehicle subassembly of claim 7 wherein said plungers each include a ball end on the projecting end thereof and wherein said connector means includes:
a cylindrical passage defined through said drive member having a diameter substantially equal to said ball ends on said plungers;
a slot defined through said drive member having a width less than the diameter of said ball ends on said plungers and communicating with said passage so that said ball ends are slidably positioned in said passage and extend through said slot; and,
retaining means connected to said driving member for retaining said ball ends within said slot.

9. The vehicle subassembly of claim 8 wherein said connector means includes a pair of push-pull cable assemblies, each having a flexible support tube and a control cable slidably carried in said support tube, one end of each of said flexible support tubes mounted on said support bracket adjacent said drive member and the other end of each of said flexible support tubes mounted adjacent said plunger of one of said control valves, one end of each of said control cables operatively connected to said drive member and the other end of said control cable operatively connected to said plunger of one of said control valves so that said control cable assemblies cause said plungers to be moved in response to movement of said control stick.

10. The vehicle subassembly of claim 2 further including an accessory mounting superstructure mounted on said side rails, said superstructure comprising a pair of primary upright stanchions mounted on said side rails and laterally aligned across said subassembly, brace means connecting the upper end of said stanchions, a pair of side enclosures extending from one side of said stanchions to the end of said side rails and overlying said side rails, a top enclosure connecting the top of said side enclosures, a door selectively connecting said side rails, side enclosures and top enclosure to define a space therebetween into which said prime mover module is slidably received, the lower ends of said primary stanchions adjacent said side rails being recessed to provide clearance for said prime mover module to be slidably received therebetween, and a pair of accessory mounting pads extending from that side of said stanchions opposite said side enclosures and overlying said side rails.

11. The vehicle subassembly of claim 2 wherein said prime mover module includes:
an internal combustion engine having a crankshaft; and
a pair of variable output, reversible hydraulic primary pumps drivingly connected to said crankshaft, each of said pumps having a control lever, the output of said pump varying in response to the position of said control lever;
said subassembly further including control means for independently positioning said control levers of said pumps to independently vary the output of said pumps; wherein there is a first pair of drive means on one side of said subassembly and a second pair of drive means on the opposite side of said subassembly, each of said drive means comprising a hydraulic motor; said subassembly further including a first flow divider/combiner valve operatively connecting the output of one of said primary pumps to said hydraulic motors of said first pair of drive means and a second flow divider/combiner valve operatively connecting the output of the other of said primary pumps to said hydraulic motors of said second pair of drive means.

12. The vehicle subassembly of claim 1 further including accessory mounting means carried by said side rails.

13. The vehicle subassembly of claim 12 wherein said accessory mounting means comprises a pair of upstanding stanchions positioned on said side rails and laterally aligned across said subassembly, a brace connecting said stanchions, and a pair of mounting pads on said side rails laterally aligned across said subassembly.

14. The vehicle subassembly of claim 1 further including control means comprising a single manually operated control stick operatively connected to each of said drive means for controlling the speed of and steering said subassembly.

15. The vehicle subassembly of claim 1 further including a first fluid tank slidably and removably mounted between said side rails under said prime mover module and a second fluid tank removably mounted between said side rails and said torque tubes.

16. The vehicle subassembly of claim 15 further including a plurality of fitting means and a plurality of quick disconnect couplings, each of said couplings having a female portion and a male portion, said female portions mounted in said second fluid tank adjacent said side rails of said base frame, said side rails defining ports therethrough in alignment with said female portions of said couplings, said male portions of said couplings operatively connected to said fitting means so that said male portions are releasably connected to said female portions through said ports in said side rails.

17. The vehicle subassembly of claim 16 wherein said second fluid tank defines an opening through the top thereof and includes a cover for selectively covering said opening and a quick release mechanism for releasably attaching said cover over said opening to close same, and further including an intake pipe extending through said cover into said tank and a filter operatively associated with said pipe so that said filter and said pipe are removed from said tank with said cover.

18. The vehicle subassembly of claim 1 wherein each of said mounting means includes:
   an annular transfer disk attached to the projecting end of said torque tube outside of said adjacent side rail and extending outwardly from said tube generally normal to said central axis of said tube;
   a spacer ring attached to the peripheral edge of said disk and extending outwardly therefrom concentrically about said central axis of said tube;
   a plurality of inwardly and radially directed support blocks circumferentially spaced around the inside of said ring, and attached to said ring and said transfer disk, each of said support blocks having a support face generally flush with the plane of the outermost edge of said ring and substantially normal to said central axis;
   a disc-shaped motor mount removably carried by said blocks at the outermost edge of said ring generally normal to said central axis, said motor mount defining a centrally located drive shaft opening therethrough, and said drive means mounted on the inside of said mounting means with said drive shaft projecting outside said mount through said drive shaft opening.

19. The vehicle subassembly of claim 1 wherein said drive shaft includes a tapered support portion and a threaded engagement portion projecting from the outside end of said tapered support portion; and wherein said wheel and tire assembly includes a hub constructed and arranged to engage said tapered support portion of said drive shaft to support said wheel and tire assembly on said drive shaft, an internally threaded hub nut adapted to threadedly engage said threaded engagement portion of said drive shaft and releasably position said hub on said tapered support portion, and wheel pulling means connecting said hub with said hub nut to forcibly withdraw said hub from said tapered support portion of said drive shaft as said nut is loosened.

20. The vehicle subassembly of claim 19 wherein said wheel pulling means includes an outwardly extending driving flange on said hub nut of a first diameter, said hub nut defining wrenching surfaces thereon having a minimum width between opposed wrenching surfaces a prescribed amount less than said first diameter; a semicircular recess defined in said hub of a second diameter substantially equal to said first diameter; an opening defined in said hub to said recess sufficiently large to receive said driving flange therethrough; an annular flange on said hub on the outside of said recess, said flange defining a central opening therein smaller than said first diameter and sufficiently large to allow said wrenching surfaces of said hub nut to rotate therein; and, a cutout defined through said flange in alignment with opening of a width substantially equal to said minimum width between said opposed wrenching surfaces of said nut.

21. The vehicle subassembly of claim 1 wherein said base frame defines an enclosure, a first space, and a second space therein; and further including:
   a prime mover module including an undercarriage movably supporting said module on said slide rails within said enclosure;
   a first fluid tank removably mounted in said first space, and operatively and releasably connected to said prime mover module;
   a second fluid tank removably mounted in said second space, and operatively and releasably connected to said prime mover module; and,
   locating means for selectively and releasably fixing said prime mover module in said enclosure.

22. The vehicle subassembly of claim 1 wherein each of said side rails has spaced apart inside and outside walls; wherein said drive means further includes fluid motor means carried by said mounting means outside of said side rails adjacent said outside walls and fluid pump means; and, further including:
   a fluid tank carried by said base frame between said side rails with opposite sides of said tank in juxtaposition with said inside walls of said side rails and operatively connected to said fluid pump means;
   a first coupling in the side of said tank in juxtaposition with said inside wall of said side rail;
   a first opening defined through said inside wall of said side rail in registration with said first coupling;
   a second coupling between said inside and said outside walls releasably engaging said first coupling through said first opening;
   a second opening through said outside wall of said side rail at said fluid motor means;
   first means operatively connecting said fluid motor means with said second coupling through said second opening and between said outside and inside walls; and,
   second means operatively connecting said first coupling with the output of said fluid pump means to power said fluid motor means.

* * * * *